United States Patent
Sevenich

(10) Patent No.: US 8,988,748 B2
(45) Date of Patent: Mar. 24, 2015

(54) OUTPUT PROFILE FOR COLOUR REPRODUCTION SYSTEM

(71) Applicant: Oce-Technologies B.V., Venlo (NL)

(72) Inventor: Johannes B. M. Sevenich, Roermond (NL)

(73) Assignee: Oce-Technologies B.V., Venlo (NL)

( * ) Notice: Subject to any disclaimer, the term of this patent is extended or adjusted under 35 U.S.C. 154(b) by 40 days.

(21) Appl. No.: 13/728,289

(22) Filed: Dec. 27, 2012

(65) Prior Publication Data

US 2013/0176580 A1    Jul. 11, 2013

(30) Foreign Application Priority Data

Jan. 10, 2012 (EP) .................................... 12150552

(51) Int. Cl.
  *H04N 1/40* (2006.01)
  *H04N 1/60* (2006.01)
(52) U.S. Cl.
  CPC ........... *H04N 1/6097* (2013.01); *H04N 1/6033* (2013.01)
  USPC .......................................... 358/527; 358/2.1
(58) Field of Classification Search
  CPC . H04N 1/6033; H04N 1/6097; H04N 1/6022; H04N 1/00; G06F 17/18; G01J 3/462; G01J 3/463; G09G 3/2003
  USPC ................... 358/504, 500, 518, 527, 1.9, 2.1, 358/1.13–1.14, 1.16, 521; 347/19; 382/167
  See application file for complete search history.

(56) References Cited

U.S. PATENT DOCUMENTS

| | | | |
|---|---|---|---|
| 7,312,893 B2 * | 12/2007 | Bestmann et al. | 358/1.9 |
| 7,571,974 B2 * | 8/2009 | Cowan et al. | 347/19 |
| 8,107,125 B2 * | 1/2012 | Freyer et al. | 358/1.9 |
| 2007/0285692 A1 | 12/2007 | Nashizawa et al. | |
| 2008/0055351 A1 | 3/2008 | Torigoe et al. | |
| 2009/0284774 A1 | 11/2009 | Kishimoto | |

* cited by examiner

*Primary Examiner* — Thomas D Lee
*Assistant Examiner* — Stephen M Brinich
(74) *Attorney, Agent, or Firm* — Birch, Stewart, Kolasch & Birch, LLP

(57) ABSTRACT

A method for characterizing a colour rendering reprographic apparatus for making an output colour profile comprises the steps of measuring a set of colour values, indicative of output of the colour rendering reprographic apparatus on a predetermined medium and processing these measurement data to profile data that are applicable for creating an output colour profile according to the standards of the International Colour Consortium. The processing step comprises a correction of a measured colour value with a medium compensation value that depends on the medium gray colour value at the same lightness as the measured colour value. The medium gray colour value is a value that results from the application of black colorant on the predetermined medium. The medium compensation value reduces to zero at the lightness of the predetermined medium. The effect of this processing step is that a profile is generated that gives prints that are both free of background colorant and have natural colour rendering.

19 Claims, 3 Drawing Sheets

OUTPUT PROFILE FOR COLOUR REPRODUCTION SYSTEM

FIELD OF THE INVENTION

The invention relates to a method for characterizing a colour rendering reprographic apparatus in order to create an output colour profile for a predefined medium, the method comprising the steps of obtaining measurement data, comprising a set of colour values, indicative of output of the colour rendering reprographic apparatus on the predefined medium and processing the measurement data to profile data, that are applicable for creating an output colour profile. The invention further relates to a computer program product residing on a computer readable medium comprising instructions to execute the invented method. The invention also relates to an output colour profile that is generated based on profile data obtained by the invented method.

BACKGROUND OF THE INVENTION

Colour rendering reprographic apparatus, such as copiers and printers, apply image data with pixels that have a colour value. A colour value indicates the colour of a pixel and comprises several colour components or colour channels. A colour value is device dependent when its colour components induce different colours in different devices or in one device with different rendering conditions, such as in a printer with different types of paper, whereas a colour value is device independent if it specifies one and the same colour, independent of a device or its condition. Several device independent colour spaces, which are essentially coordinate systems for colour values, have been proposed for different purposes.

CIE (Commission International de l'Eclairage) colour spaces are device independent colour spaces using CIE Standard Observer functions that are based on colour matching functions and result in a unique set of tristimulus components XYZ for any colour measured under specified conditions. The tristimulus components XYZ are calculated from the spectral output of either an additive or subtractive colour system convoluted with a response function of either a 2 degree or 10 degree Standard Observer. In the case of a reflective hard copy, the spectral reflectance curve is typically convoluted with a standard illuminant, such as $D_{50}$, to estimate the expected spectral output of the reflective colour. A very often used CIE colour space is the CIELAB colour space, wherein L* represents lightness, a* represents redness-greenness, and b* represents yellowness-blueness. CIELAB, which was established in 1976, employs a modified von Kries chromatic adaptation algorithm. Chromatic adaptation refers to perception of colour under different illuminants. According to the modified von Kries algorithm, chromatic adaptation involves dividing the tristimulus components XYZ by the white reference tristimulus components $X_w Y_w Z_w$ that are obtained for a perfectly diffuse white reflecting colour. In that way L*a*b* is (100,0,0) for the white reference colour under any illuminant. Therefore the colour with these coordinates is called neutral white. Similarly (0,0,0) is called neutral black and the axis in L*a*b* space between these points is called the neutral axis.

In order to render an image that is perceived similarly on various devices, each with its own colour space, the ICC (International Colour Consortium, www.icc.org) has created a standard environment for converting colour values. For this purpose so-called colour profiles are defined that comprise relations between colour values in a Profile Connection Space (PCS), which is a device independent colour space, and colour values in a device dependent colour space, such as RGB and CMYK values. An input device, such as a camera or a scanner, is characterized by an input colour profile, defining e.g. a relation between RGB and L*a*b*. An output device, such as a printer or a monitor, is characterized by an output colour profile, defining e.g. a relation between L*a*b* and CMYK or between L*a*b* and RGB. By combining the input and output profiles a conversion table for converting an image defined in the input colour space to an image defined in the output colour space is obtained.

The characterization, or profiling, of an output colour device occurs by measuring a number of predefined output colours under standard illuminating conditions. The production of these colours uses colour values in the device dependent colour space, whereas the measurement generates measurement values in a device independent colour space. Several commercial profiling software applications exist, such as Xrite/GretagMacbeth Profile Maker®, that derive a number of transforms, or rendering intents, that relate or associate these colour values in one colour space to colour values in the other colour space, thereby constituting an output profile. Each rendering intent, being one of four prescribed intents, has specific characteristics for transforming colours, particularly when colours are involved that are outside one of the colour gamuts.

For printers, a characteristic that is very important is the colour of the medium on which the image is reproduced. This is often a colour close to white, meaning that light of every wavelength in the visible range is to a substantial amount diffusively reflected. If, however, light with short wavelength is reflected somewhat less than other wavelengths, the medium may look yellowish, whereas if light with short wavelength is reflected somewhat more than other wavelengths, or if the medium comprises fluorescent material, the medium may look bluish. This is the shade of the medium.

By applying only black colorant on a medium having a shade, a monochrome hard copy is obtained. The medium without colorant is used to represent the pixels with the highest lightness in the image data. By the combination of pixels fully developed with black colorant and pixels with no colorant, gradations appear that are perceived as gray colours relative to the white medium, but colorimetrically these gray colours are not neutral. Therefore these gray colours are called medium gray colours to discern them from the neutral gray colours whose values are part of the neutral axis in the device independent colour space that was mentioned earlier. The darkest colour value occurs when all pixels in an area are developed with black colorant. In fact, as a function of the applied amount of pixels developed with black colorant, the lightness of gray areas varies from medium white to full black, defining a media gray axis in the colour space. The available lightness values in the image data may be scaled to the full range of gradations that the printer is able to reproduce. This gives the largest contrast in the image. Alternatively, the lightness is not scaled and a hard copy may result in which the most light image areas are reproduced with a small number of black pixels, which looks like background development. This is only used in special situations, e.g. for the reproduction of old photographs. The shade of the medium is not relevant for either monochrome hard copy.

When the same media is applied in colour printing, the shade of the medium affects the colours of areas on which a colorant is developed. Each rendering intent in an output colour profile accounts for the medium colour in its own specific way. An absolute rendering intent matches the input and output colours as accurately as possible. Therefore, when neutral white is the input colour, the absolute rendering intent compensates for the medium colour by developing some colorant of an opposite colour, e.g. a bluish medium takes a small amount of yellow colorant, in order that the output looks as much as possible like neutral white. The colorant that compensates the medium colour is similar to background colorant. A relative rendering intent however, uses the medium white as the white reference colour. Using this intent, neutral white is associated with no application of colorant. This may be viewed as a mapping of neutral white to the colour position of medium white. In the case of a bluish medium all colours are colorimetrically rendered more bluish and neutral white is rendered without background colorant, which is satisfying for many images. For other images the reproduction is inferior, because the colours do not look natural. No rendering intent is known that satisfies the different demands for good reproductions on different media with varying colour shades. Therefore in printing a hard copy there is a problem in combining the demands of having an output free of background colorant and natural colour rendering on arbitrary media.

An object of the present invention is to obviate the above problem.

SUMMARY OF THE INVENTION

According to the present invention the method for characterizing a colour rendering reprographic apparatus is extended with the step of correcting a measured colour value with a medium compensation value to obtain a profile value, such that the relation between the profile value and the medium white colour is similar to the relation between the measured value and a neutral white colour, which is the colour of a perfectly diffuse white reflecting area, the medium compensation value reducing to zero when the lightness of the measured colour value approaches the lightness of the predefined medium. Correcting a measured colour value means that a colour in the device dependent colour space is associated with a different colour than actually measured. This deforms the gamut, which is the set of all printable colours. When the neutral white input colour is associated with no application of colorant, it is rendered by the output colour profile as the medium white colour. All other colours are in that case transformed in a similar direction. Experiment has shown that correcting the measured colour values in that same direction revokes this transformation and makes the colours look more natural. Neutral input colours are not rendered as medium gray colours, but they are rendered more like colorimetrically neutral colours at the expense of applying some colorant in addition to the black colorant. Therefore the hard copy is free of background colorant and has natural colour rendering, which solves a problem of contemporary profiles.

In a further embodiment the medium compensation value depends on a medium gray colour value with the same lightness as the measured colour value, the medium gray colour value being a colour value on a medium gray axis running from the medium white colour to a black colour. The black colour is for example a colour value on the neutral axis at the lightness of the darkest measured colour value. The medium gray colour value represents the amount of transformation that the colours with colorant endure. By relating the compensation value to this amount, a right amount of compensation is obtained.

In a further embodiment the medium compensation value is a product of a correction function that depends on the lightness only, and colour components of the medium gray colour value, the correction function having a value zero for a lightness that corresponds to the lightness of the predefined medium. This provides for a convenient way of splitting the variables for the medium compensation value.

In a further embodiment the medium compensation value reduces to zero for a lightness that corresponds to the darkest measured colour value. This measure associates the neutral black colour to the darkest measured colour value when the darkest measured colour value is not on the neutral axis in a similar way as the neutral white colour is associated with the medium white colour. However, the black colorant is often not as far removed from the neutral axis as is the medium white colour.

In a further embodiment the lightness of the colour values in the profile data is equal to the lightness of the measured colour values in the measurement data. This limits the change of the measured data to the shade of the reproduced colours only without affecting their lightness.

In a further embodiment the colour values are determined in CIELAB colour coordinates, comprising $L^*$ representing lightness, $a^*$ representing redness-greenness, and $b^*$ representing yellowness-blueness. This provides a convenient way of making the calculation of the medium compensation values.

In a further embodiment the medium compensation value is the $a^*$, $b^*$ value of the medium gray colour value, multiplied by a predefined correction function of $L^*$. This function provides a convenient way to calculate medium compensation values for various media.

In a further embodiment a fraction of the compensation value is applied to partly correct the measured colour values in the indicated way. Although the effect is less pronounced than when a full compensation value is applied, it is still noticed that the colours become more natural.

The invention further encompasses a computer program product residing on a computer readable medium for characterizing a colour rendering reprographic apparatus in order to create a output colour profile for a predetermined medium, the product comprising instructions for causing a computer to:

obtain measurement data, comprising a set of colour values, indicative of output of the colour rendering reprographic apparatus on the predetermined medium;

process the set of measured colour values to a set of profile values, that are applicable for creating an output colour profile, wherein a measured colour value is corrected with a medium compensation value to obtain a profile value, such that the relation between the profile value and the medium white colour is similar to the relation between the measured value and a neutral white colour, which is the colour of a perfectly diffuse white reflecting area, the medium compensation value reducing to zero for a lightness that corresponds to the lightness of the predefined medium.

The invention further encompasses an output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to any method described above.

Further object, features and advantages of the method and the print system will be apparent from the more particular description of the exemplary embodiments of the print engine and the print system, as illustrated in the accompanying drawings in which like reference numbers refer to the same parts throughout the different figures. The drawings are not necessarily to scale, emphasis instead being placed upon illustrating the principle of the invention.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
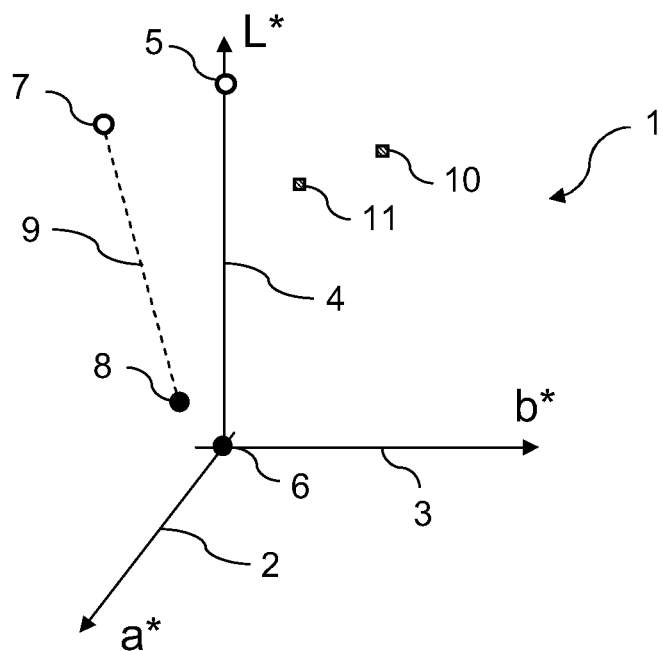
FIG. 1 is a representation of a colour space for indicating the position of various colours.

In FIG. 1 a conventional colour space (1) is shown as set up by the three axes of CIELAB. This colour space is defined by the Commission International de l'Eclairage (CIE, www.cie.co.at). The a*-axis (2) represents a red-green balance, the b*-axis (3) represents a yellow-blue balance and the L*-axis (4) represents a lightness of colours. Neutral colours are positioned on the L*-axis. The position of a perfectly diffuse white reflecting colour is (L*, a*, b*)=(100, 0, 0), neutral white (5), which is the most light reflecting colour. The position of the darkest neutral colour is (0, 0, 0), neutral black (6). The colour of a predefined medium, medium white, is in general not on the neutral axis. In FIG. 1 it is indicated as a bluish colour (7), which has a negative b*-value. By application of a full coverage of only black colorant the colour full black is obtained (8). Usually the colour full black is closer to the neutral axis than the colour medium white. Between the colour medium white (7) and the colour full black (8) a medium gray axis (9) represents the position of colours that are rendered by partially covering the medium with black colorant. More dark colours may be obtained in a colour rendering apparatus by applying several colorants collectively. However, the position of these colours are not necessarily on the medium gray axis.

An arbitrary colour (10) is shown in FIG. 1. Its position relative to the neutral white colour (5) may be represented by a vector in the colour space. According to the invention the measured value of the arbitrary colour (10) is changed into a profile value (11) such that the relation between the profile value (11) and the medium white colour (7) is similar to the relation between the measured colour value (10) and the neutral white colour (5). In other words, a profile value (11) is derived from a measured colour value (10) by shifting this value in a similar direction as would be needed to obtain the medium white colour (11) from the neutral white colour (5). However, when the lightness of the measured colour value is close to the lightness of the medium the profile value is close to the measured colour value, because the compensation value reduces to zero.

Figure 2:
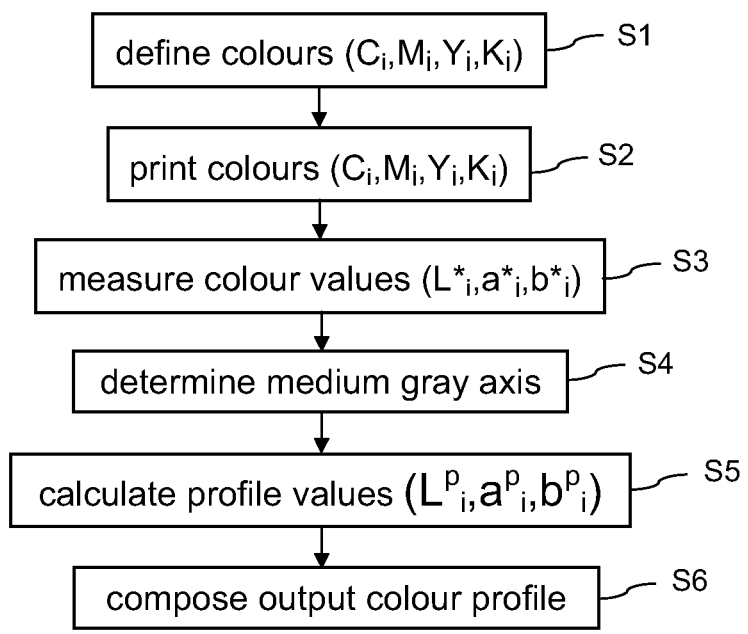
FIG. 2 is a stepwise embodiment of the invention.

In FIG. 2 a number of steps of an embodiment of the invention is shown. As a first step in generating an output colour profile for a predefined medium a number of colours is defined in a device dependent colour space (S1). For many colour printers four colorants are used and the device dependent colour space comprises four components that specify the amount of colorant that is applied. The colour, having number i, is in this case defined by the coverage values for each of the colorants cyan ($C_i$), magenta ($M_i$), yellow ($Y_i$) and black ($K_i$). For printers with different colorants correspondingly different colour components will be specified. The number of colours may be about 500 to 2000, but may be in principle as many as deemed necessary for making a good profile. It is also possible that other device dependent colour channels are applied for indicating the amount for each colorant.

As a second step (S2) the colours are printed by the output device on the predefined medium for which combination the profile is made. The conditions for printing are as close as possible to the conditions that are applied when regularly operating the output device. In a further step (S3) the colour values are measured by illuminating the printed colour samples by a standard illuminant, $D_{50}$, and collecting the reflected light. For this measurement several standard devices are available. The output of this step is a list of device independent colour values, e.g. $L^*_i$, $a^*_i$, $b^*_i$. It is also possible to use other illuminants to measure these colour values. In a following step (S4) the colours that define the medium gray axis, which is the set of colours that is made by applying black colorant only to the predefined medium. The medium gray axis may be defined as a set of $a^*_j$, $b^*_j$ depending on $L^*_j$. For every value of the lightness $L^*$ a medium gray colour value is found by interpolation of the discrete values in the set. Therefore after this step for each value of $L^*$ a set of $a^g$, $b^g$ is available, defining the medium gray axis.

Using the medium gray axis, the measured colour values are in this embodiment corrected in the following way (S5):

$$L_i^P = L^*_i$$

$$a_i^P = a^*_i + F(L^*_i)a^g(L^*_i)$$

$$b_i^P = b^*_i + F(L^*_i)b^g(L^*_i) \qquad (1)$$

wherein $L_i^P$, $a_i^P$, $b_i^P$ represent the profile data values and $F(L^*_i)$ represents a correction function that depends on the lightness and becomes zero for a lightness corresponding to the lightness of the predefined medium. The next step is to input the profile data in the output colour profile generating software application, such as Xrite/GretagMacbeth Profile Maker®. In this way an output colour profile according to the invention is obtained.

Figure 3:
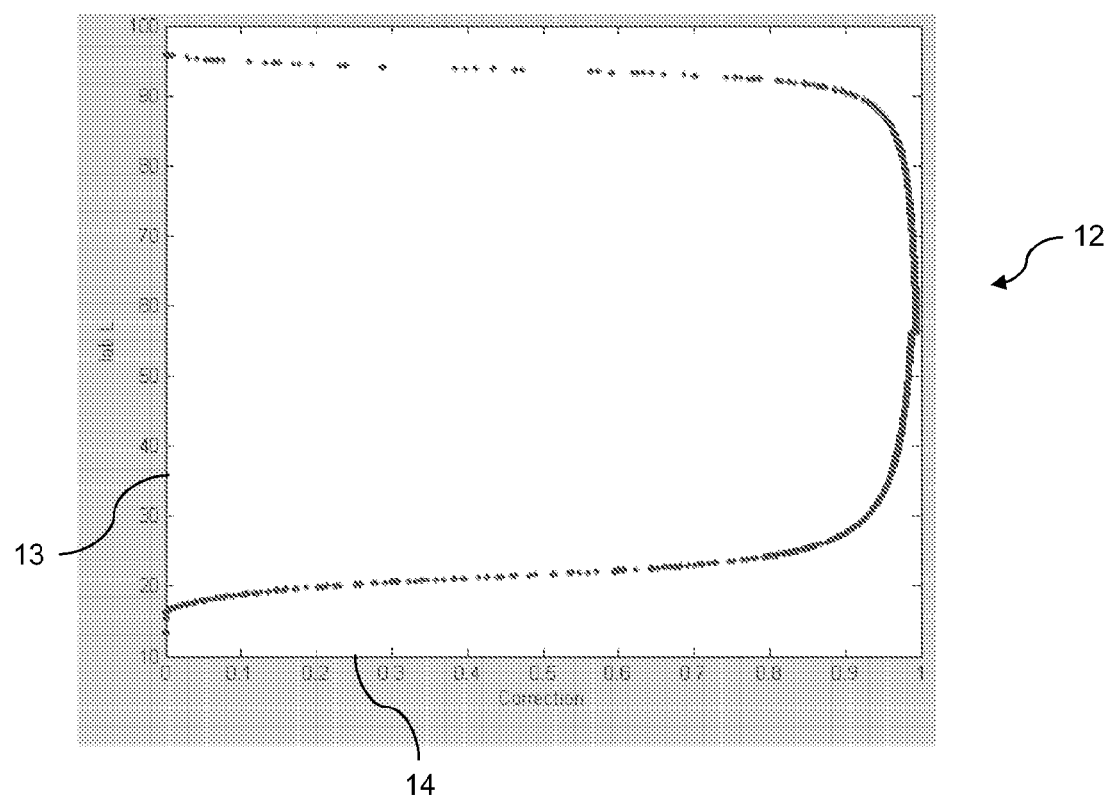
FIG. 3 is a graph of a correcting function that is applicable in the invention.

In FIG. 3 an example of a correction function $F(L^*_i)$ is given. The graph (12) shows the relation between the lightness $L^*$ on the vertical axis (13) and the correction factor F on the horizontal axis (14). The minimum value of $L^*$ is the lightness of the full black colour and the maximum value is the lightness of the medium white. The range of F is from 0 to 1. As can be seen F shows a transition for 0 for low values of $L^*$ to 1 for intermediate values of $L^*$ and a transition from 1 to 0 for intermediate values to high values of $L^*$. For this course several mathematical expressions can be used with various slopes for the transitions. For the function shown in FIG. 3 a combination of two S-shaped curves has been applied. It is not necessary for the correction function to reach to 1 for intermediate values of $L^*$, since also a substantial fraction of the compensation value reduces the influence of the medium colour in the colours that are printed on it. If, for example, the maximum value of F is 0.5, a profile is obtained that makes the prints free of background colorant and showing strongly improved natural colours. Neutral gray input values will be rendered with black and some colorant, but not as much as for higher maximum F values.

Figure 4:
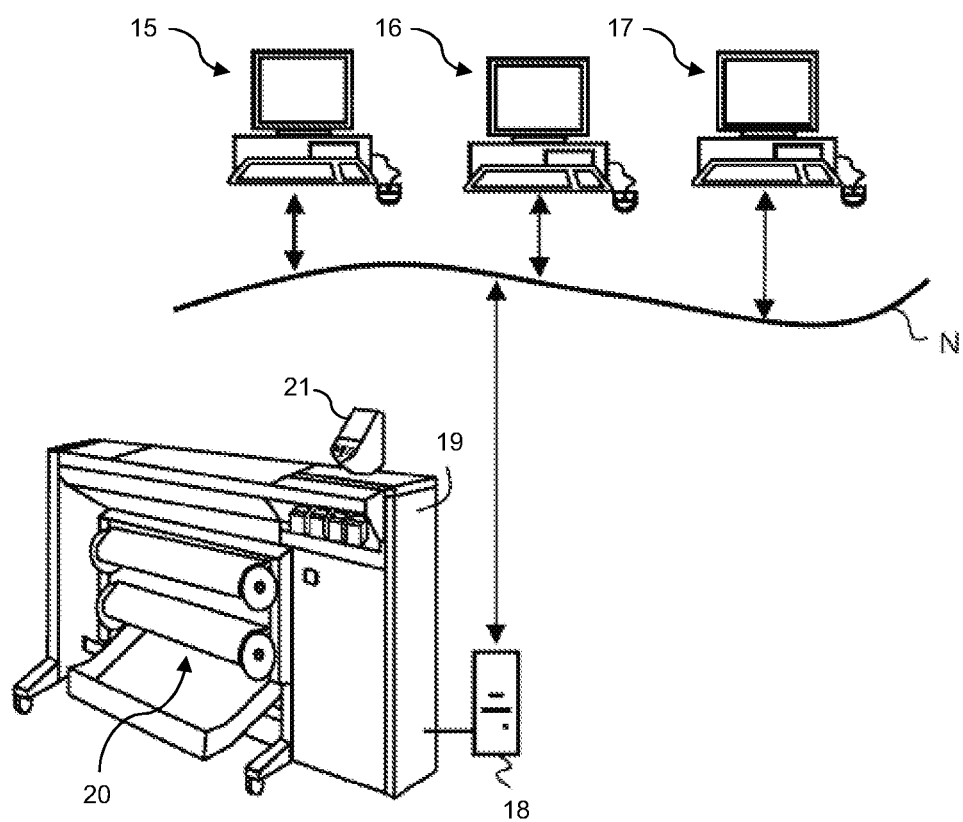
FIG. 4 is a printing system for printing an image on a selected receiving medium, which is associated with a profile according to the invention.

FIG. 4 shows a printing system for printing image data on a selected receiving medium. The image data are prepared for submission to a print engine on a client computer 15, 16, 17, such as a personal computer or a mobile communication device, which is connected to a network N, either by a wire connection or in a wireless way. A controller 18, or Digital Front End, is receiving the image data with print parameters indicating a preferred manner of printing the image, including a selection of a medium on which the image is to be printed. The controller 18 associates with the selected medium an output colour profile for processing the image data into print data that are sent to the print engine 19. The output colour profile may have been downloaded through the internet from the site of the medium supplier, if he has performed the profiling for the combination of the medium and the printing engine according to the invented method, but the output colour profile may also have been composed by an operator of the print engine. The print engine comprises positions for receiving media 20. After changing a medium, the user interface 21 is applied to indicate which medium has been introduced on a media position 20 of the print engine. This information is shared with the controller 18. Many other configurations of associating an output colour profile with a receiving medium on a print engine are possible.

The above disclosure is intended as merely exemplary, and not to limit the scope of the invention, which is to be determined by reference to the following claims.

The invention claimed is:

1. A method for creating an output colour profile for a predefined medium having a medium white colour, the method comprising the steps of:
    a) obtaining measurement data, comprising a set of measured colour values, indicative of output of the colour rendering reprographic apparatus on the predefined medium;
    b) processing the set of measured colour values to a set of profile values, that are applicable for creating an output colour profile, wherein a measured colour value is corrected with a medium compensation value to obtain a profile value, thereby shifting the measured colour value in a similar direction as a direction from the neutral white colour to the medium white colour, such that the relation between the profile value and the medium white colour is similar to the relation between the measured colour value and a neutral white colour, which is the colour of a perfectly diffuse white reflecting area, the medium compensation value reducing to zero when the lightness of the measured colour value approaches the lightness of the predefined medium;
    (c) generating an output colour profile based on the set of profile values; and
    (d) using the output colour profile to reproduce image data on said predefined medium with a colour rendering reprographic apparatus.

2. The method according to claim 1, wherein the medium compensation value depends on a medium gray colour value with the same lightness as the measured colour value, the medium gray colour value being a colour value on a medium gray axis running from the medium white colour to a black colour.

3. The method according to claim 2, wherein the medium compensation value is a product of a correction function that depends on the lightness only, and colour components of the medium gray colour value, the correction function having a value zero for a lightness that corresponds to the lightness of the predefined medium.

4. The method according to claim 1, wherein further the medium compensation value reduces to zero for a lightness that corresponds to the darkest measured colour value.

5. The method according to claim 2, wherein the colour values and the medium gray colour values are determined with reference to a standard illuminant.

6. The method according to claim 2, wherein the lightness of a colour value in the profile data is equal to the lightness of an associated measured colour value in the measurement data.

7. The method according to claim 1, wherein the colour values are determined in CIELAB colour coordinates, comprising L* representing lightness, a* representing redness-greenness, and b* representing yellowness-blueness.

8. The method according to claim 7, wherein the medium compensation value is the a*, b* value of the medium gray colour value, multiplied by a predefined correction function of L*.

9. The method according to claim 1, wherein a fraction of the medium compensation value is applied to partly correct the measured colour values in the indicated way.

10. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 1.

11. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 2.

12. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 3.

13. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 4.

14. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 5.

15. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 6.

16. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 7.

17. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 8.

18. An output colour profile for converting device independent colour values to colour values that are applicable in a colour rendering reprographic apparatus comprising a black colorant, characterised in that the output colour profile is based on profile data that are obtained by processing measurement data comprising a set of colour values, indicative of output of the colour rendering reprographic apparatus on a predetermined medium, according to the method claimed in claim 9.

19. A computer program product residing on a non-transitory computer readable medium for characterizing a colour rendering reprographic apparatus in order to create a output colour profile for a predetermined medium, the product comprising instructions for causing a computer to:
   a) obtain measurement data, comprising a set of colour values, indicative of output of the colour rendering reprographic apparatus on the predetermined medium;
   b) process the set of measured colour values to a set of profile values, that are applicable for creating an output colour profile, wherein a measured colour value is corrected with a medium compensation value to obtain a profile value, thereby shifting the measured colour value in a similar direction as a direction from the neutral white colour to the medium white colour, such that the relation between the profile value and the medium white colour is similar to the relation between the measured value and a neutral white colour, which is the colour of a perfectly diffuse white reflecting area, the medium compensation value reducing to zero for a lightness that corresponds to the lightness of the predefined medium; and
   c) generate an output colour profile based on the set of profile values for reproducing image data on said predefined medium.

* * * * *